(12) United States Patent
Asnis

(10) Patent No.: US 7,730,294 B2
(45) Date of Patent: Jun. 1, 2010

(54) SYSTEM FOR GEOGRAPHICALLY DISTRIBUTED VIRTUAL ROUTING

(75) Inventor: James David Asnis, Santa Cruz, CA (US)

(73) Assignee: Nokia Corporation, Espoo (FI)

( * ) Notice: Subject to any disclaimer, the term of this patent is extended or adjusted under 35 U.S.C. 154(b) by 1514 days.

(21) Appl. No.: 10/861,226

(22) Filed: Jun. 4, 2004

(65) Prior Publication Data

US 2006/0080462 A1    Apr. 13, 2006

(51) Int. Cl.
G06F 1/24    (2006.01)
(52) U.S. Cl. ............... 713/100; 713/153; 713/163; 713/189; 726/1; 726/2; 726/11; 726/12; 709/238; 709/245; 370/351; 370/400; 370/401
(58) Field of Classification Search ........... 713/163, 713/189, 153, 100; 709/238, 245; 726/11, 726/12, 1, 2

See application file for complete search history.

(56) References Cited

U.S. PATENT DOCUMENTS

| | | | | |
|---|---|---|---|---|
| 5,796,736 | A | 8/1998 | Suzuki | 370/399 |
| 6,522,629 | B1 * | 2/2003 | Anderson, Sr. | 370/236 |
| 6,556,547 | B1 * | 4/2003 | Srikanth et al. | 370/317 |
| 6,628,661 | B1 * | 9/2003 | Goldman et al. | 370/408 |
| 6,675,225 | B1 * | 1/2004 | Genty et al. | 709/245 |
| 6,744,774 | B2 * | 6/2004 | Sharma | 370/401 |
| 6,885,667 | B1 * | 4/2005 | Wilson | 370/392 |
| 6,907,039 | B2 * | 6/2005 | Shen | 370/400 |
| 6,944,785 | B2 * | 9/2005 | Gadir et al. | 714/4 |
| 6,965,937 | B2 * | 11/2005 | Gaddis et al. | 709/227 |
| 6,970,459 | B1 * | 11/2005 | Meier | 370/389 |
| 6,996,741 | B1 * | 2/2006 | Pittelkow et al. | 714/5 |
| 7,299,294 | B1 * | 11/2007 | Bruck et al. | 709/235 |
| 7,593,346 | B2 * | 9/2009 | McLaggan et al. | 370/252 |
| 2002/0016926 | A1 * | 2/2002 | Nguyen et al. | 713/201 |
| 2002/0069257 | A1 * | 6/2002 | Rigori et al. | 709/217 |

(Continued)

FOREIGN PATENT DOCUMENTS

JP    8032597    2/1996

(Continued)

OTHER PUBLICATIONS

International Search Report and Written Opinion of the International Searching Authority for International Application No. PCT/IB05/01525 dated Apr. 21, 2006.

*Primary Examiner*—Nasser G Moazzami
*Assistant Examiner*—Shanto M Abedin
(74) *Attorney, Agent, or Firm*—Harrington & Smith

(57) ABSTRACT

A system for managing a distributed MetaHop that is administered, managed, and monitored as a single entity. If a new gateway is added to a MetaHop, the gateway can be provisioned with membership credentials by an administrator who indicates relatively basic information for the new gateway to join the MetaHop. Once provisioned with relatively basic information, the new gateway can be shipped to a relatively remote site where it automatically seeks out an entry point to the MetaHop. After connecting to an entry point (or entry points), the new gateway is automatically provisioned with any other information used to join the MetaHop. In one embodiment, the joined gateway is automatically enabled to forward traffic. In another embodiment, a new gateway is disabled for traffic forwarding until the administrator enables it for such forwarding on the MetaHop.

26 Claims, 8 Drawing Sheets

U.S. PATENT DOCUMENTS

| | | | |
|---|---|---|---|
| 2002/0089982 A1* | 7/2002 | Novaes | 370/390 |
| 2002/0103631 A1* | 8/2002 | Feldmann et al. | 703/22 |
| 2003/0041170 A1* | 2/2003 | Suzuki | 709/238 |
| 2003/0054810 A1 | 3/2003 | Chen et al. | 455/422 |
| 2003/0088698 A1* | 5/2003 | Singh et al. | 709/239 |
| 2003/0154399 A1* | 8/2003 | Zuk et al. | 713/201 |
| 2003/0185151 A1 | 10/2003 | Kurosawa et al. | 370/219 |
| 2004/0008694 A1* | 1/2004 | Guo | 370/395.52 |
| 2004/1009343 * | 5/2004 | Genty et al. | 709/245 |
| 2005/0025179 A1* | 2/2005 | McLaggan et al. | 370/468 |
| 2005/0076207 A1* | 4/2005 | Park et al. | 713/163 |
| 2005/0094624 A1 | 5/2005 | Patfield et al. | 370/352 |
| 2006/0031436 A1 | 2/2006 | Sakata et al. | 709/221 |

FOREIGN PATENT DOCUMENTS

| | | |
|---|---|---|
| JP | 2002 2252631 | 9/2002 |
| JP | 2002 290441 | 10/2002 |
| JP | 2003 283543 | 10/2003 |

* cited by examiner

SYSTEM FOR GEOGRAPHICALLY DISTRIBUTED VIRTUAL ROUTING

FIELD OF THE INVENTION

The present invention is directed to routing packets over a network, and more particularly, to routing packets towards their destination based on meta-hop information

BACKGROUND OF THE INVENTION

A virtual private network (VPN) enables secure communication over an external/untrusted IP network such as the Internet. A VPN provides a relatively secure way to connect nodes on internal trusted networks that are remote from each other, such as clients, servers, and host computers. Encryption and other security mechanisms are typically employed to create secure point to point "tunnels" for plain text messages/packets between authorized users over an untrusted external network. Typically, "plain text" packets are encrypted and inserted into an outer packet. The inner "plain text" packet is subsequently "tunneled" (forwarded) over the untrusted external IP network from one VPN gateway to another VPN gateway where the outer packet is decrypted and the inner "plain text" packet is forwarded towards its destination on the internal network. The other packet serves as a protective shell or encapsulation for the "plain text" packet as it is tunneled from one node to another node over the external untrusted network.

Typically, a gateway in a VPN also operates as a router for IP traffic on their internal networks. For example, upon receiving a "plain text" packet from a node on a trusted internal network, the VPN gateway looks up the destination in a selector list to see whether or not the packet was directed to a destination outside the locally attached internal network and if it should be encrypted for tunneling to the destination. If true, the VPN gateway securely tunnels the "plain text" packet to a particular VPN gateway peer associated with the destination over an external untrusted network. The particular VPN gateway peer determines if the destination of this tunneled packet is on their own selector list. And if so, decrypts the encrypted packet and forwards it to a node on its locally attached internal network. Additionally, if the destination of the "plain text" packet had not been on the selector list but had been an entry in a routing table, the VPN gateway would have forwarded the unencrypted plain text packet to the destination.

As more and more gateways are added to a VPN, a mesh topology may be developed where all of the gateways were aware of every other gateway in the VPN. Also, tunnels may be established between each gateway in the VPN. However, since each tunnel can be associated with a selector in a list kept at each gateway, an administrator has to update this list at each gateway whenever a new gateway was added to the VPN. Thus, as the number of gateways in a VPN grows, the effort required to update each list of selectors on each gateway can become burdensome.

Some gateways such as routers and firewalls have hardware platforms that allow for the "hot swap" addition (or removal) of interfaces. Typically, such a gateway employs an operating system such as Nokia's IPSO operating system to automatically discover the insertion of a new interface and present the new interface to the administrator. This type of gateway can continue to operate normally during the insertion/presentation process. Also, the administrator can at times provide rules or routing configuration information for the "hot swap" interfaces that are added to the gateway.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
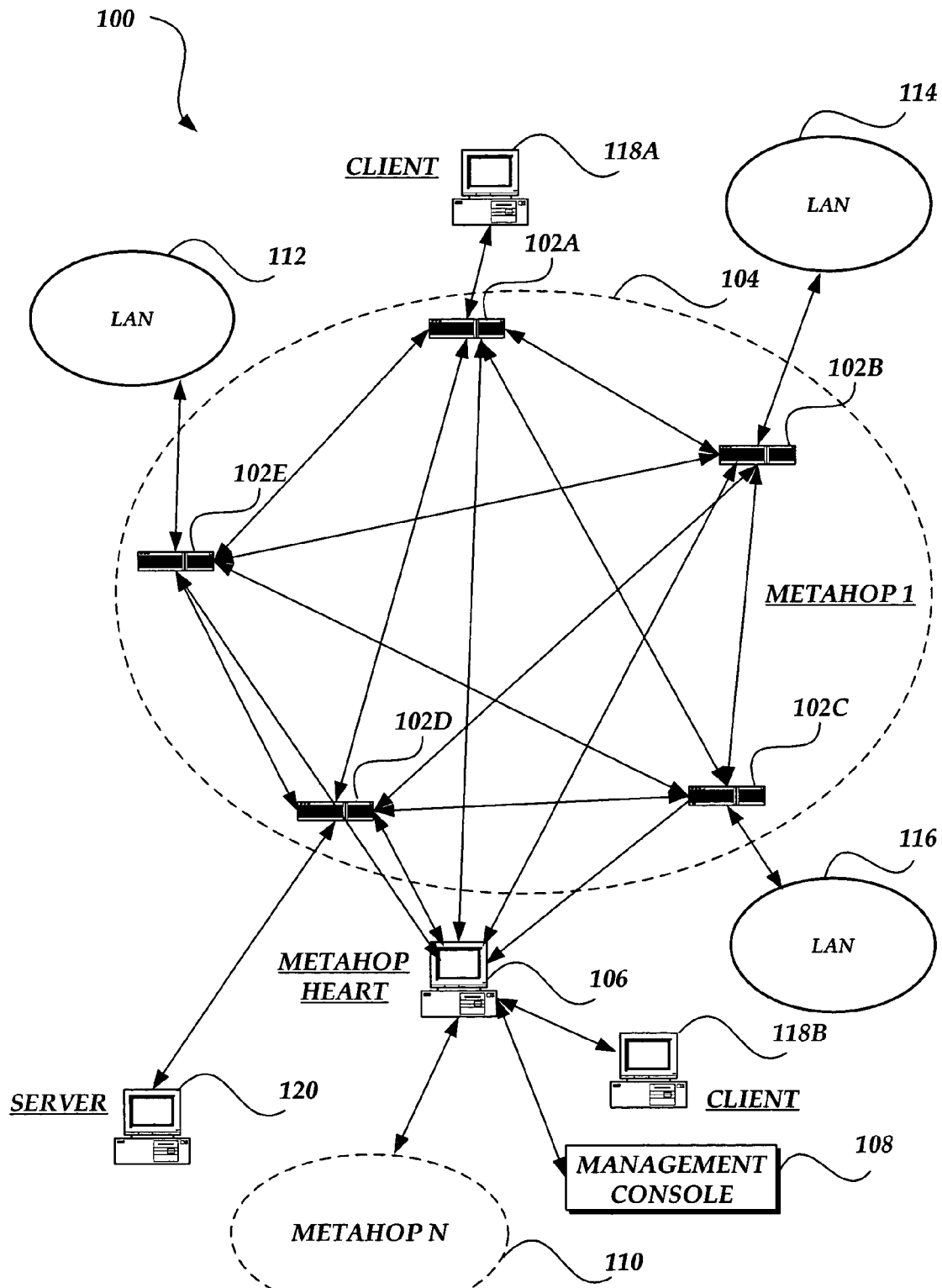
FIG. 1 illustrates a block diagram showing an exemplary system for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed to a system, apparatus, and method for managing a group of geographically distributed gateways as a single MetaHop. A MetaHop is administered, managed, and monitored as a single entity. If a new gateway is added to a MetaHop, the gateway can be provisioned with membership credentials over an internal network by an administrator who indicates relatively basic information for the new gateway. Once provisioned with relatively basic information, the new gateway can be shipped to a relatively remote site where it automatically seeks out it's entry point to the MetaHop over an external network. After connecting to an entry point (or entry points) on the external network, the new gateway downloads other information and automatically joins the MetaHop. In one embodiment, the joined gateway is automatically enabled to forward traffic over tunnels between MetaHop gateways. In another embodiment, a new gateway that is joined to the MetaHop is disabled for forwarding traffic until the administrator enables it to do so. Additionally, if a tunnel between two gateways in the MetaHop becomes unavailable, another temporary tunnel path is automatically reconfigured between the gateways. In one embodiment, the reconfigured temporary tunnel path may include at least one intermediate gateway in the Meta-Hop.

If a new gateway is to be added to a MetaHop, the gateway can be provisioned with relatively basic information such as a unique identifier and a site by an administrator who indicates that "this new gateway is a part of the MetaHop. Here are the credentials for the new gateway to join the MetaHop. (in whatever form that may take)". Once provisioned with this relatively basic information, the new gateway can be shipped to a relatively remote site where it automatically seeks out it's entry point to the MetaHop. After connecting to an entry point (or entry points), the new gateway is automatically provisioned with other information used to join the MetaHop. The new gateway lets the other gateways know it exists and based at least in part on its membership in the Metahop, each gateway knows whether or not it should tunnel traffic to and from the new gateway.

Individual gateways in a MetaHop can have externally facing interface information such as IP addresses, PPPOE credentials and/or DNS servers, and the like, for establishing encrypted tunnels to other gateways over untrusted portions of the MetaHop. However, through automatic policy management of this externally facing interface information, the gateways in the MetaHop enable an administrator to consider the geographically distributed nodes as a single entity.

Management Console

In operation, the "internally facing" MetaHop interface(s) for a gateway is somewhat similar to a "hot swap" interface for a router/firewall, albeit different. For example, when a new gateway joins a MetaHop, this event can be treated in the management console as though the "internally facing" interfaces of the newly joined gateway are dynamically added interfaces to the Metahop. The MetaHop management console can provide a primary dashboard for the administrator to configure the internally facing interface (or interfaces) of each remotely located gateway as though the MetaHop were a single router with as many interfaces. The management console for the MetaHop can include several other facilities. In one embodiment, a facility can be provided for managing membership and deployment of network devices in the MetaHop. Another facility can be provided for monitoring any network device participating in the MetaHop. Also, the console can include a facility for managing the forwarding applications (of "plain text" packets) through the MetaHop.

Additionally, since the MetaHop can automatically handle the forwarding of encrypted packets (tunneling) on the externally facing interfaces of the gateways, the management console typically presents an administrator with a dashboard that emphasizes information relevant to internally facing interfaces for internal networks and de-emphasizes or hides information related to the externally facing interfaces of the gateways. The de-emphasis of externally facing interface information helps to further the perception to an administrator that a MetaHop can be viewed as a single entity. Also, the automatic arrangement of the externally facing interfaces of the gateways enables the gateways themselves to craft the selector lists employed to route (tunnel) encrypted packet traffic point-to-point between gateways. The MetaHop enables participating gateways to automatically reconfigure themselves in response to changes in their arrangement and membership without the assistance of the administrator.

For example, if a tunnel between gateway A and gateway M has failed but both of these gateways can still communicate with gateway R, gateways A and M would automatically discover the common connection with gateway R and create an alternate tunneled route between gateways A and M by way of gateway R. Because this reconfiguration of the tunneled route occurs automatically, an administrator doesn't have to reconfigure all of the nodes in the network. Rather, the gateways themselves automatically discover the best path to forward the encrypted traffic through and update each other accordingly.

Additionally, a monitoring facility for the management console can be arranged to enable an administrator to monitor tunnel reconfiguration activity from any point of connection to the Metahop. Also, the dashboard for the management console can be arranged to provide a visualization of this reconfiguration activity, such as the disconnection of a tunnel and creation of a temporary alternate tunnel path between gateways. This automatic tunnel reconfiguration enables encrypted (tunneled) traffic to flow between MetaHop gateways whether or not an originally configured tunnel is up and without requiring an administrator to manually reconfigure the tunnels between the gateways if an originally configured tunnel is unavailable.

A "MetaHop Heart" server is typically provided to enable automatic management of gateway memberships and tunnel reconfiguration, and support addresses for application proxies. The MetaHop Heart server can operate with multiple MetaHops and provide a facility to support the operation of the management console. Additionally, the MetaHop Heart server can facilitate the monitoring of substantially each event that is associated with the MetaHop. Also, the MetaHop Heart server can provide support for a repository that logs substantially each event associated with the MetaHop. This repository may be centralized or distributed over the MetaHop. Furthermore, the logged events can be employed to forensically troubleshoot any operational issues of forwarding packets over the MetaHop.

IPSec

A MetaHop keeps the "plumbing element" (tunnels between gateways, provisioning of new gateways, and the like) relatively transparent or invisible to the administrator until he/she wants to see it. Also, in a MetaHop, gateways can be abstractly viewed as interfaces to remote sites that have their own internal networks. A MetaHop enables an enhanced version of routing over IPSec or dynamic VPN where the secure network automatically discovers, adjusts and scales in a dynamic way (not just in the routing protocols) to changes in tunnels that are available between gateways.

Additionally, the Metahop enables a routing engine and an IP Security (IPSec) engine to be integrated together in a gateway. For example, if a gateway gets a routing update from its the internal network, it will add the update to its internal routing tables and also inform its IPSec engine to adjust the selector list to include this new route. Likewise, the gateway's IPSec engine informs the other members/gateways in the MetaHop of the new subnet that it now protects. At the other gateways, their routing daemons would advertise to their internal network the new change to the routing table. Typically, the IPSec engines for the other gateways have already updated their selector lists by the time the routing protocols advertise this change.

Multicast Routing

Multicast IP traffic is "one-to-many" traffic (one source, multiple destinations) whereas typical IP traffic (client/server) is "one-to-one" traffic, i.e., one source and one destination. For example, a multicasting data source at Site A (e.g. a site that streams stock quotes to multiple clients) can have separate clients at Sites B, C and D that want to receive this data. In the past, multicast IP traffic has been difficult for VPNs to manage. Additionally, IPSec selectors were not originally architected to protect "one-to-many" IP traffic. However, a MetaHop can be arranged to operate as a multicast router for multicast IP traffic in part by cloning the packets and tunneling them as appropriate.

The MetaHop can operate like a multicast router for multicast traffic where each gateway in the MetaHop acts as a separate interface on the multicast router. For example, if a multicast query is received on one of the interfaces (gateways) of the MetaHop, be it from any site, the gateway can update a local multicast routing tree and propagate that request on every other interface (gateway in the MetaHop), in a manner substantially similar to a multicast router. In this way, an encrypted "hop" can be integrated into the multicast trees without explicitly indicating that there is a tunnel in the middle of it. This arrangement simplifies the details on how to handle multicast traffic and eases the ability of the MetaHop to work with existing protocols.

Gateway Provisioning

A multicast-based protocol can be employed by a new gateway connected to an internal network to advertise itself based on a unique identifier such as its serial number. In response to the multicast on the local network, a membership facility can download MetaHop information to the new gateway, such as entry point IP address(es), membership credentials, static information (internal IP address and the like), and configuration information such as enable/disable automatic forwarding of packets upon joining the MetaHop. In doing so, the membership facility removes the use of Layer 3 information (or a serial line connection) in getting the MetaHop membership information to the new gateway. Further, the use of the multicast protocol and unique identifying information enables an administrator to assign membership in a MetaHop to a new gateway that is not based on a common IP address.

In one embodiment, an administrator could individually provision each gateway on a relatively large new MetaHop by providing a policy manager facility with a list of serial numbers that correspond to each gateway and a specific site that each gateway belongs to. Based on this list, the policy manager facility could determine when a particular gateway was connected to the local network and automatically download provisioning information associated with the specific site. The policy manager facility could reside on one of the new gateways or it could operate on the MetaHop Heart server that enables the operation of the management console for the new MetaHop.

In another embodiment, an administrator could configure new gateways for an existing relatively large MetaHop by creating a serial number list that corresponds to particular sites on the network. The administrator could hand off the provisioning to someone else with directions to "unpack the new gateways in these boxes, connect them to the network, turn them on, when some indication on a gateway tells you that the gateway has received its credentials, unplug it, put it back in its box and ship it to the specific site that its serial number corresponds to." At the corresponding site, the new gateway can be powered on again and connected to the external network such as the Internet, where it can access at least one entry point in the MetaHop and join. The gateway could be enabled to automatically begin routing traffic or wait for the administrator to enable this feature at the management console.

In another embodiment, an administrator could individually provision each gateway on a relatively small new MetaHop (less than 10 nodes) by also providing a policy manager facility with a list of serial numbers that correspond to each gateway and the specific site that each gateway belongs to. The first gateway can be powered up and configured through the management console to include enough management credentials to start to create the MetaHop. After that, this first "powered up" gateway can employ its own Certificate Authority to manage the credentials and membership of the other gateways as they power up and join the MetaHop. In this case, the first gateway can also operate as the MetaHop Heart server for provisioning the other gateway as discussed elsewhere in the specification. In place of facilitating the operation of a separate management console running on a separate operating system, the first gateway can provide substantially the same operational capability as the console through a command line interface (CLI), browser connection, and the like, running on the local operating system of the first gateway.

Firewall

A virtual firewall can run on top of the MetaHop. Since the MetaHop can substantially operate as a large distributed router, it can be also configured for a virtual firewall to run on top of it, instead of separately configured firewalls for each gateway. In one embodiment, interface specific firewall rule lists could be configured for particular sites. These interface specific firewall rule lists could be checked before or after the rule lists for the virtual firewall. Although a separate instance of a firewall could run on each gateway, the administrator could manage one firewall rule list for the virtual firewall that would automatically be applied to each gateway at each site.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes gateways 102A-102E that are connected to each other through tunnels over an external network in a mesh topology to form MetaHop 104. Local Area Networks (LANS) 112, 114, and 116, server 120, and clients 118A and 118B are disposed outside of MetaHop 104 and are in communication with gateways 102E, 102B, 102C, 102D, and 102A, respectively. Additionally, MetaHop Heart server 106 is in communication by separate tunnels with each of the gateways (102A-102E) in MetaHop 104. MetaHop Heart server 106 is also in communication over tunnels with gateways (not shown) disposed in another MetaHop 110. Additionally, client 118B is disposed outside the MetaHops and it is in substantially direct communication with MetaHop Heart server 106.

MetaHop Heart server 106 is in communication with and facilitates the operation of management console 108. Management console 108 can provide a dashboard (not shown) to visually present MetaHops 104 and 110 as singular entities and display information regarding internally facing interfaces associated with internal networks, such as LANS 112-116.

Generally, gateways 102A-102E may include virtually any computing device capable of connecting to another computing device to send and receive information over a network, including routers, firewalls, and the like. Additionally, the types of devices for server 120 and clients 118A and 118B may also include virtually any computing device capable of communicating over a network using a wired or wireless communications medium such as personal computers, multiprocessor systems, microprocessor-based or programmable consumer electronics, network PCs, and the like.

MetaHops 104 and 110 are configured to employ any form of computer readable media for communicating information from one electronic device to another that is capable of Layer 3 communication under the Open Systems Interconnection (OSI) model. Also, a MetaHop can include the Internet in addition to local area networks (LANs), wide area networks (WANs), direct connections, such as through a universal serial bus (USB) port, other forms of computer-readable media, or any combination thereof. On an interconnected set of LANS, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Additionally, MetaHops 104 and 110 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media capable of Layer 3 communication under the Open Systems Interconnection (OSI) model such as, but not limited to, twisted pair, coaxial cable, fiber optics, wave guides, and other wired media and wireless media such as, but not limited to, acoustic, RF, infrared, and other wireless media.

Figure 2:
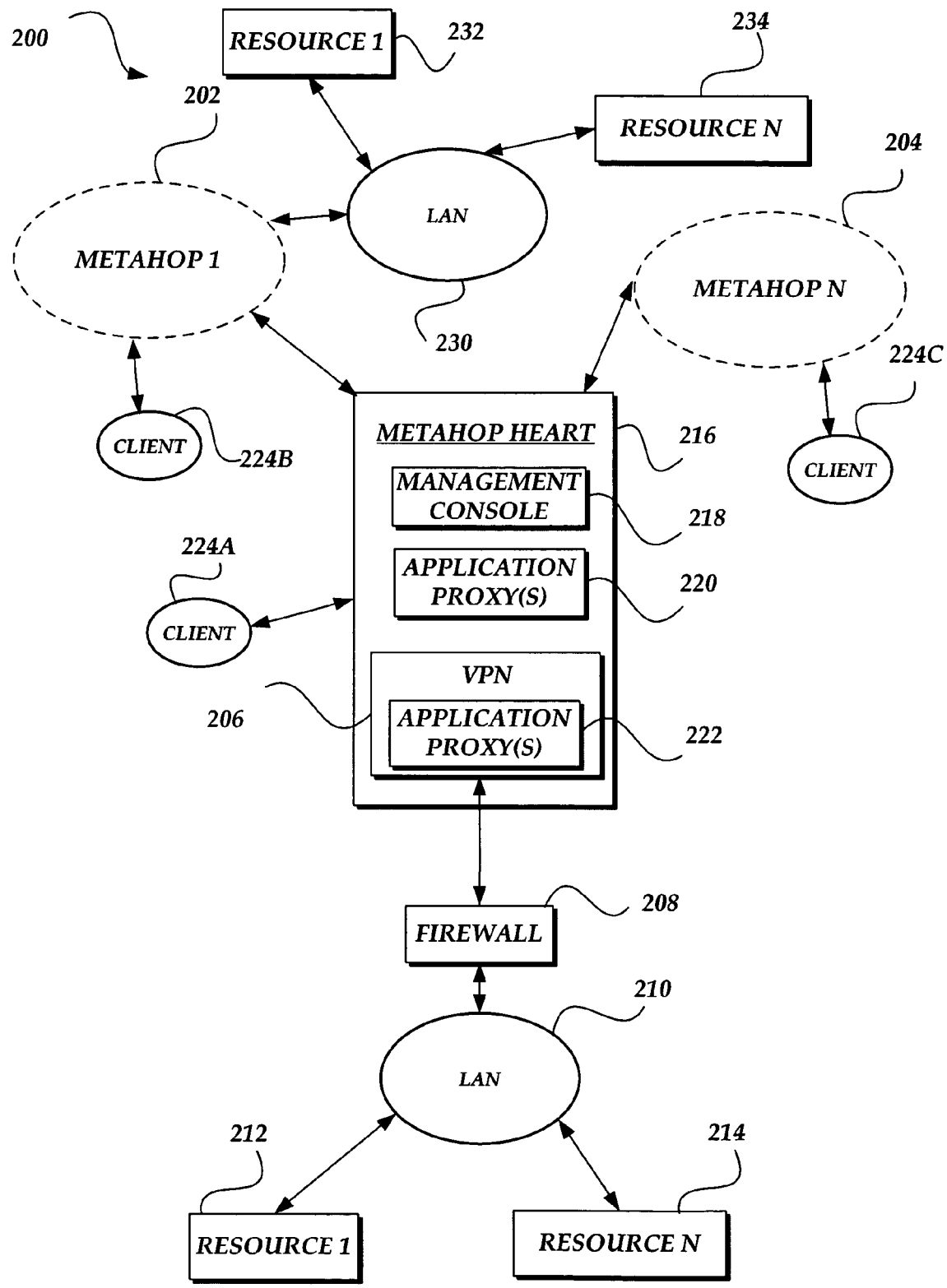
FIG. 2 shows a block diagram illustrating another exemplary system.

FIG. 2 illustrates an overview 200 of system that enables managed access to individual resources on internal networks by authorized users that are connected to a MetaHop. As shown, MetaHop Heart server 216 is in communication with MetaHop 202 and MetaHop 204. MetaHop Heart server 216 comprises several facilities including, but not limited to, management console 218, application proxy(s) 220, and Virtual Private Network (VPN) application 206 which also includes application proxy(s) 222. VPN application 206 is coupled through firewall 208 to an internal network (LAN 210) and "n" resources (212 and 214). VPN 206 provides a tunneled communication channel to each of resources 212 and 214. Also, application proxies 220 and 222 can provide IP addresses for a resource in response to a request.

MetaHop 202 is connected to an internally facing network (LAN 230) which is coupled to "n" resources (232 and 234). Clients 224A, 224B, and 224C are connected to MetaHop Heart server 216, MetaHop 202, and MetaHop 204, respectively. Additionally, MetaHop 204 can be groups of mobile nodes, such as cellular telephones, pagers, wireless notebook computers, wireless personal digital assistants (PDA), wireless personal computers, and the like. Gateway 206 can also include at least one application proxy 222.

Illustrative MetaHop Heart Environment

Figure 3:
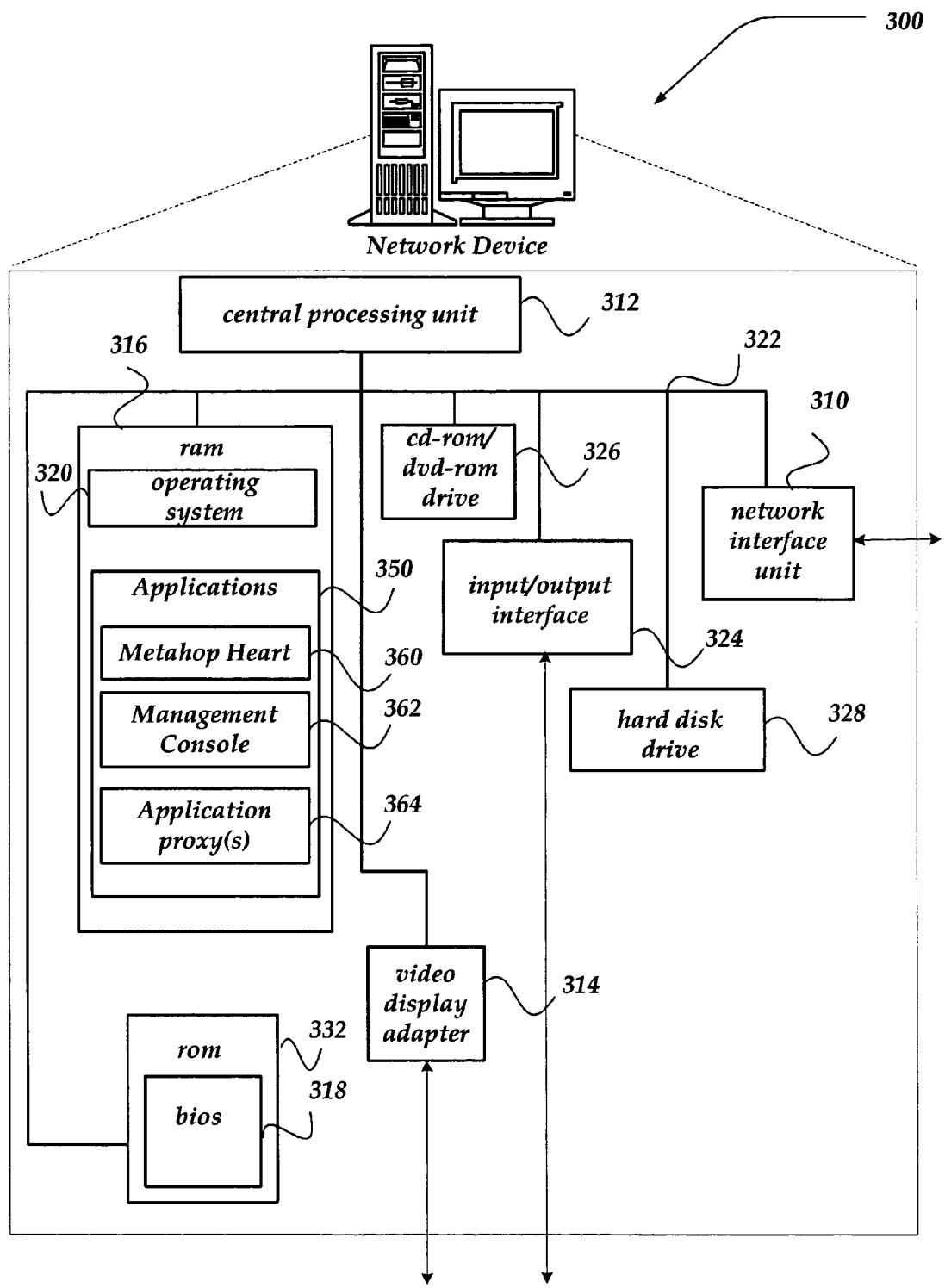
FIG. 3 illustrates a schematic diagram showing an exemplary network device.

FIG. 3 shows one embodiment of a network device for enabling the operation of the MetaHop Heart server, according to one embodiment of the invention. Network device 300 may include many more components than those shown. The components shown, however, are sufficient to disclose an illustrative embodiment for practicing the invention.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the RIP, OSPF, SNMP, HTTP, UDP/IP, and TCP/IP protocols. For example, in one embodiment, network interface unit 310 may employ a hybrid communication scheme using both TCP and IP multicast. Network interface unit 310 is sometimes known as a transceiver, network interface card (NIC), and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, graphics programs, database programs, word processing programs, HTTP programs, user interface programs, various security programs, and so forth. Mass storage may further include applications such as MetaHop Heart server 360, management console 362, and application proxy(s) 364.

Embodiments of MetaHop Heart Server 360, management console 362, and application proxy 364 are described in more detail in conjunction with FIGS. 1 and 2. These applications may also interact with other components residing on the network device, another network device, gateway, and the like. The other components could include a client application, security application, transport application, and the like.

Network device 300 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 300 may further include applications that support virtually any secure connection, including but not limited to TLS, TTLS, EAP, SSL, IPSec, and the like.

Network device 300 also includes input/output interface 324 for communicating with external devices, such as a mouse, keyboard, scanner, or other input devices not shown in FIG. 3. Likewise, network device 300 may further include additional mass storage facilities such as CD-ROM/DVD- ROM drive 326 and hard disk drive 328. Hard disk drive 328 may be utilized to store, among other things, application programs, databases, client device information, policy, security information including, but not limited to certificates, ciphers, passwords, and the like.

Illustrative Gateway Environment

Figure 4:
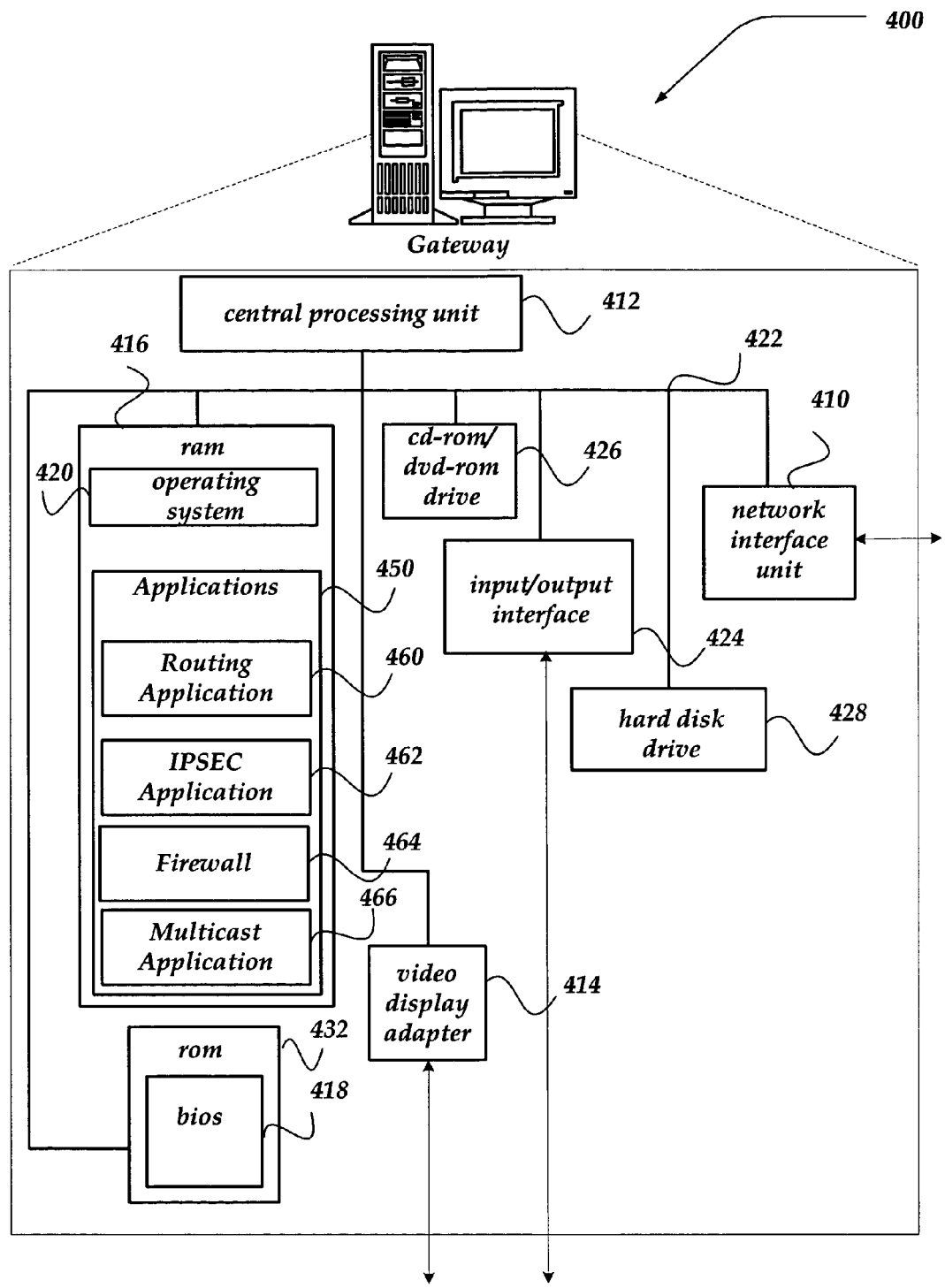
FIG. 4 shows a schematic diagram illustrating an exemplary gateway.

FIG. 4 shows one embodiment of a network device for enabling the operation of a gateway, according to one embodiment of the invention. Gateway 400 may include many more components than those shown. The components shown, however, are sufficient to disclose an illustrative embodiment for practicing the invention.

Network device 400 includes processing unit 412, video display adapter 414, and a mass memory, all in communication with each other via bus 422. The mass memory generally includes RAM 416, ROM 432, and one or more permanent mass storage devices, such as hard disk drive 428, tape drive, optical drive, and/or floppy disk drive. The mass memory stores operating system 420 for controlling the operation of gateway 400. Any general-purpose operating system may be employed. Basic input/output system ("BIOS") 418 is also provided for controlling the low-level operation of gateway 400. As illustrated in FIG. 4, gateway 400 also can communicate with the Internet, or some other communications network, via network interface unit 410, which is constructed for use with various communication protocols including the RIP, OSPF, SNMP, HTTP, UDP/IP, and TCP/IP protocols. For example, in one embodiment, network interface unit 410 may employ a hybrid communication scheme using both TCP and IP multicast. Network interface unit 410 is sometimes known as a transceiver, network interface card (NIC), and the like.

One or more applications 450 are loaded into mass memory and run on operating system 420. Examples of application programs may include transcoders, schedulers, graphics programs, database programs, word processing programs, HTTP programs, user interface programs, various security programs, and so forth. Mass storage may further include applications such as routing application 460, IPsec application 462, firewall 464, and multicast application 466. These applications may also interact with other components residing on the network device, another network device, gateway, and the like.

Gateway 400 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, gateway 400 may further include applications that support virtually any secure connection, including but not limited to TLS, TTLS, EAP, SSL, IPSec, and the like.

Gateway 400 also includes input/output interface 424 for communicating with external devices, such as a mouse, keyboard, scanner, or other input devices not shown in FIG. 4. Likewise, gateway 400 may further include additional mass storage facilities such as CD-ROM/DVD-ROM drive 426 and hard disk drive 428. Hard disk drive 428 may be utilized to store, among other things, application programs, databases, client device information, policy, security information including, but not limited to certificates, ciphers, passwords, and the like.

Illustrative Flowcharts

Figure 5:
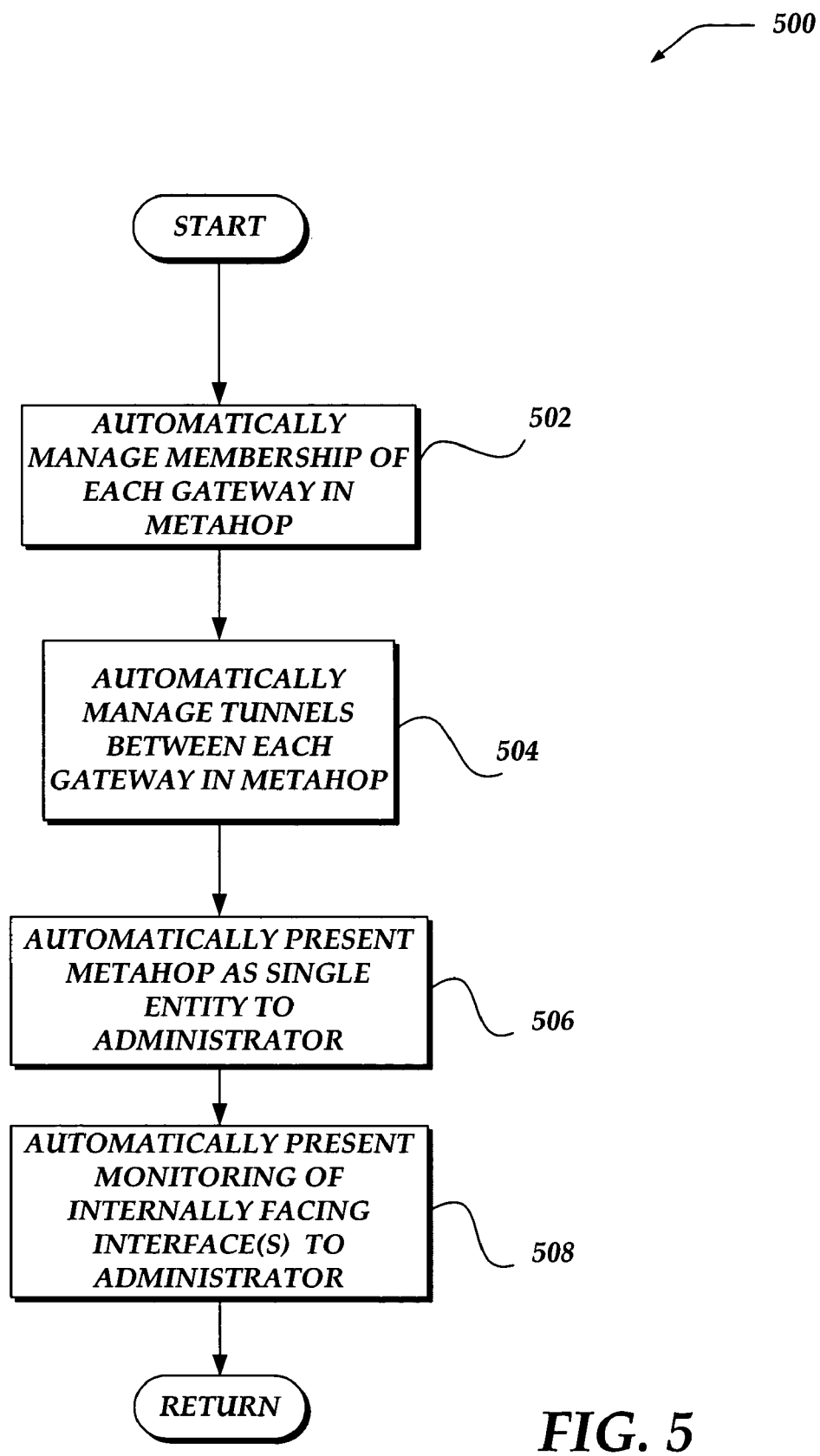
FIG. 5 illustrates a flow chart for automatically managing the general operation of a MetaHop.

FIG. 5 illustrates a flow chart of an overview of process 500 for automatically handling many of the externally facing interfaces of a MetaHop so that an administrator doesn't have to spend time doing so. Moving a start block, the process flows to block 502 where the membership of each gateway in the MetaHop is automatically managed. Briefly, relatively basic information provided by the administrator such as a new gateway's site of attachment to a MetaHop and a unique identifier (typically a serial number, and the like) are used to automatically deploy the new gateway and dynamically manage tunnels between each gateway in the MetaHop.

The process flows to block 504, where the configurations of each tunnel between each gateway in the MetaHop are automatically managed. For example, if a particular tunnel between two gateways becomes unavailable, the MetaHop automatically reconfigures another temporary tunnel path between the two gateways. Although the MetaHop may advise an administrator of the temporary tunnel path, this reconfiguration would occur automatically and with relatively no effort on the part of the administrator.

The process advances to block 506 where the network devices in a MetaHop are automatically abstracted to a single entity that can be presented to the administrator for monitoring. Additionally, a management console can be employed by an administrator to provide information that can be used to deploy a new gateway in the MetaHop, characterize the MetaHop as a distributed and singular entity, and the like.

Stepping to block 508, the process automatically enables the presentation of monitoring information regarding internally facing interfaces to an administrator. In one embodiment, a dashboard application may be employed to display a visualization of the MetaHop's internally facing interfaces for internal network(s) with information such as IP addresses, ports, status, and type. Also, the dashboard application can be arranged to display the externally facing interfaces for the MetaHop's external network(s) as a single entity where additional information may be presented on a secondary display, e.g., node, site, and gateway. Moving from block 508, the process returns to performing other actions.

Figure 6:
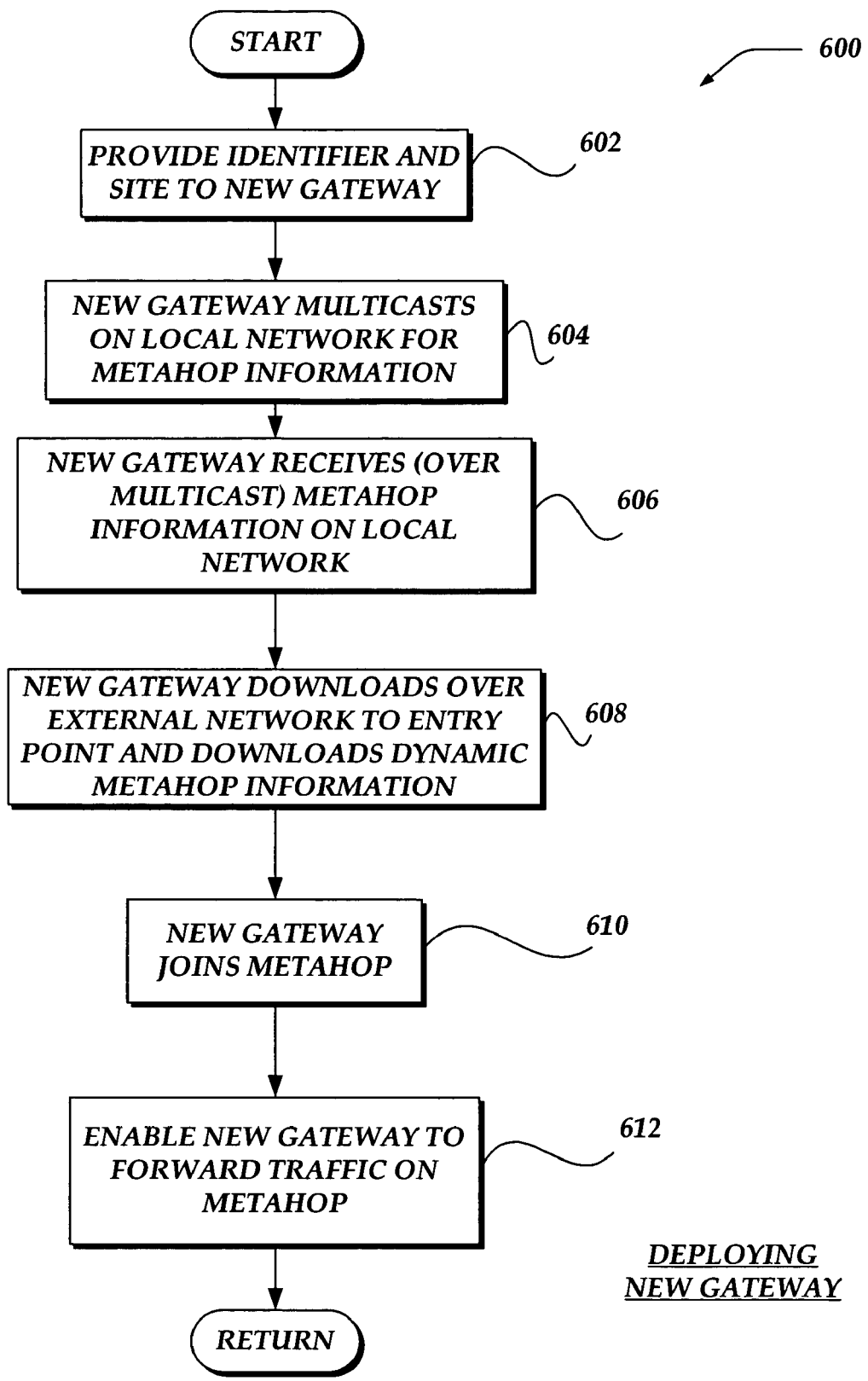
FIG. 6 shows a flow chart for automatically provisioning a new gateway in a MetaHop.

FIG. 6 illustrates flow chart 600 for deploying a new gateway for a MetaHop. Moving from a start block to block 602 the process provides the site where the new gateway can operate as a member of the MetaHop and a unique identifier such as the serial number of the gateway, and the like. In one embodiment, the unique identifier and site are provided by the administrator at a management console that is facilitated by a MetaHop Heart server.

At block 604, the new gateway is connected to an internal local area network where it multicasts for MetaHop information. Stepping to block 606, the new gateway receives over multicast the MetaHop information, including, but not limited to, an entry point IP address, MetaHop membership credentials, static information such as an internal IP address, configuration information such as enabling/disabling the automatic forwarding of packets upon initially joining the MetaHop.

At block 608, the new gateway is coupled to an external network and unicasts to the entry point IP address where it downloads the remainder of the MetaHop information employed to join the MetaHop. This remaining information may include Dynamic MetaHop information regarding reconfiguration of temporary tunnel paths between gateways.

The process flows to block 610 where it joins the Metahop based on the MetaHop information that it downloaded from the internal network and the external network. The process advances to block 612 where it is enabled to forward traffic (packets) over tunnels on the Metahop. In one embodiment, the new gateway automatically begins forwarding traffic. In another embodiment, the new gateway waits to forward traffic until this functionality is confirmed by an administrator. Next, the process returns to performing other actions.

Figure 7:
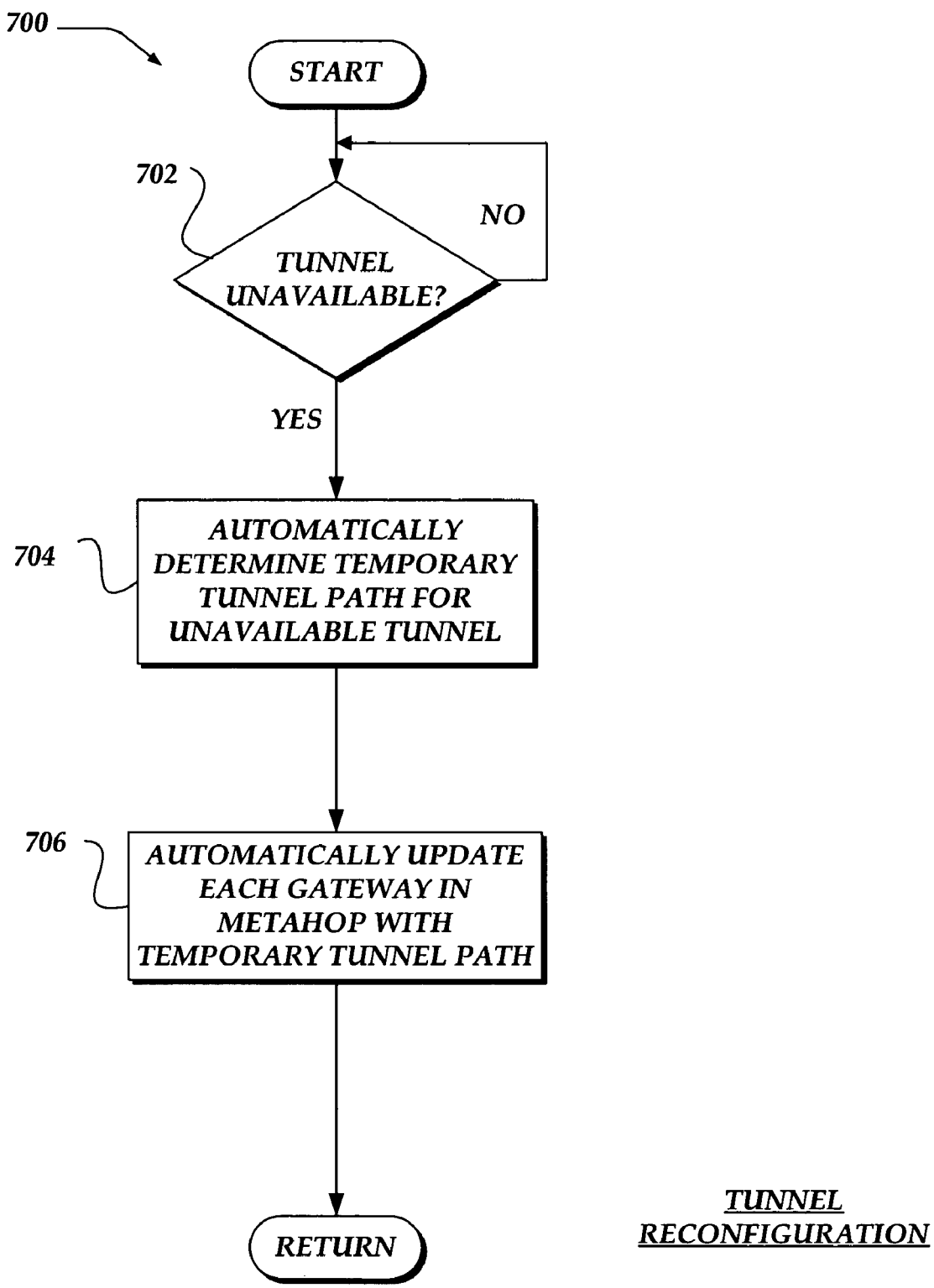
FIG. 7 illustrates a flow chart for automatically reconfiguring tunnels in a MetaHop.

FIG. 7 illustrates flow chart 700 for enabling automatic reconfiguration of tunnels in a MetaHop. Moving from a start block, the process steps to decision block 702 where a determination is made as to whether or not a tunnel between gateways in a MetaHop has become unavailable. If true, the process advances to block 704 where the MetaHop automatically determines a temporary tunnel path for the original tunnel. In come cases, this temporary tunnel path may employ multiple tunnels between intermediate gateways to substantially replace the unavailable original tunnel between two gateways.

Stepping to block 706, the process automatically updates each gateway in the MetaHop with the temporary tunnel path. Also, once the original tunnel becomes available again, the MetaHop will automatically update each gateway again with the original tunnel. Next, the process returns to performing other actions.

Figure 8A:
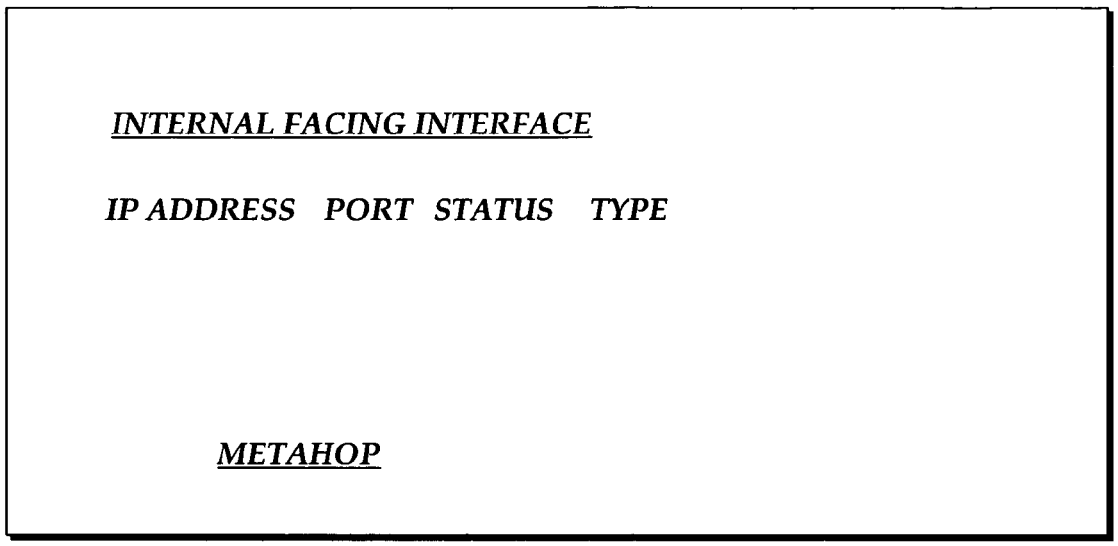
FIG. 8A shows an exemplary management console dashboard for internally facing interfaces.
Figure 8B:
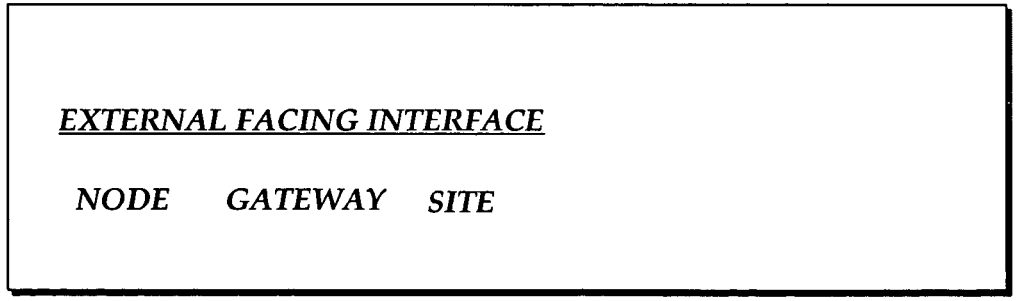
FIG. 8B illustrates an exemplary management console dashboard for externally facing interfaces in accordance with the invention.

FIG. 8A illustrates a block diagram of exemplary dashboard 800 that provides for the display of information regarding the MetaHop's internally facing interfaces such as internal networks. The dashboard is shown displaying information regarding internal networks, including IP addresses, ports, status, and types. Also, the dashboard is arranged to display a MetaHop as a single entity. In another embodiment, information regarding the MetaHop may not be displayed at all unless a serious problem has occurred. FIG. 8B shows a block diagram of exemplary dashboard 810 that provides for a secondary display of information regarding the MetaHop's externally facing interfaces such as gateway, node and site.

Moreover, it will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A system, comprising:
a geographically distributed virtual internet protocol router that comprises a plurality of gateways each comprising at least one data processor and at least one network interface unit, wherein at least one tunnel is provided for each gateway to communicate with at least one of the other plurality of gateways, and
wherein the geographically distributed virtual internet protocol router is configurable to be administered as a single entity, and wherein a temporary tunnel is automatically reconfigured for each tunnel that was previously available to the geographically distributed virtual internet protocol router that becomes unavailable for communication, said automatic reconfiguration comprising reconfiguring the gateways which are part of a reconfiguration temporary tunnel route and without reconfiguring all of said plurality of gateways, where the geographically distributed virtual internet protocol router performs further actions, comprising
enabling partial provisioning of geographically distributed virtual internet protocol router information to the new gateway over an internal network,
automatically provisioning the remaining geographically distributed virtual internet protocol router information to the new gateway over an external network, and
employing the provisioned geographically distributed virtual internet protocol router information to automatically join the new gateway to the geographically distributed virtual internet protocol router over the external network.

2. The system of claim 1, further comprising:
an application proxy to provide an internet protocol (IP) address for an application in response to a request.

3. The system of claim 1, further comprising:
a heart server that performs further actions, including,
automatically reconfiguring the temporary tunnel back to the tunnel if the tunnel becomes available for communication.

4. The system of claim 1, further comprising:
a management console that enables automatic management of the operation of the geographically distributed virtual internet protocol (IP) router as a single entity.

5. The system of claim 4, further comprising:
a dashboard that provides a visual representation of the geographically distributed virtual internet protocol (IP) router as a single entity.

6. The system of claim 4, further comprising:
a dashboard that provides a display of information related to internally facing interfaces coupled to at least one gateway in the geographically distributed virtual internet protocol (IP) router.

7. The system of claim 1, wherein internet protocol security (IPsec) is employed for a tunneled communication between gateways in the geographically distributed virtual internet protocol (IP) router.

8. The system of claim 1, further comprising a virtual firewall that is configurable as a single entity in the geographically distributed virtual internet protocol (IP) router.

9. The system of claim 8, wherein the virtual firewall further provides for a separate firewall at each gateway in the geographically distributed virtual internet protocol (IP) router.

10. A method, comprising:
enabling a geographically distributed virtual internet protocol router comprised of a plurality of gateways each comprising at least one network interface unit, the geographically distributed virtual internet protocol router configured to provide at least one tunnel for each of the plurality of gateways to communicate with at least one peer gateway in the geographically distributed virtual internet protocol router, wherein the geographically distributed virtual internet protocol router is configured to perform administration operations to the plurality of gateways as a single entity; and enabling a heart server to perform actions, comprising automatically configuring a temporary tunnel for each tunnel in the geographically distributed virtual internet protocol router that is unavailable for communication, said automatic reconfiguration comprising reconfiguring the gateways which are part of a reconfiguration temporary tunnel route and without reconfiguring all of said plurality of gateways, the method further comprising employing the geographically distributed virtual internet protocol router to automatically provision a new gateway to connect to an entry point and join the geographically distributed virtual internet protocol router; and enabling the automatic provisioning of the new gateway based at least in part on a serial number associated with the gateway and a site where the new gateway is to be operated.

11. The method of claim 10, further comprising:
employing an application proxy to provide an internet protocol (IP) address for an application in response to a request.

12. The method of claim 10, further comprising:
employing a management console to enable automatic management of the operation of the geographically distributed virtual internet protocol (IP) router as a single entity.

13. The method of claim 12, further comprising:
enabling a dashboard to provide a visual representation of the geographically distributed virtual internet protocol (IP) router as a single entity, wherein the dashboard is enabled to provide a display of information related to an internal network coupled to at least one gateway in the geographically distributed virtual IP router.

14. The method of claim 10, wherein internet protocol security (IPsec) is employed for the tunnel between gateways in the geographically distributed virtual internet protocol (IP) router.

15. The method of claim 10, further comprising:
enabling a virtual firewall to be configurable as a single entity in the geographically distributed virtual internet protocol (IP) router.

16. The method of claim 15, wherein the virtual firewall further provides for a separate firewall at each gateway in the geographically distributed virtual internet protocol (IP) router.

17. An apparatus, comprising:
means for providing at least one tunnel for each of a plurality of gateways to communicate with at least one peer gateway in a geographically distributed virtual internet protocol router, wherein the geographically distributed virtual internet protocol router is configured to administrate as a single entity; and wherein each of said plurality of gateways is comprised of at least one data processor and at least one network interface unit;

means for automatically configuring a temporary tunnel for each tunnel that was previously available to the geographically distributed virtual internet protocol router that is unavailable for communication, said automatic reconfiguration comprising reconfiguring the gateways which are part of a reconfiguration temporary tunnel route and without reconfiguring all of said plurality of gateways;

means for automatically configuring the geographically distributed virtual internet protocol router to automatically provision a new gateway connect to an entry point and join the geographically distributed virtual internet protocol router; and means for automatically provisioning the new gateway based at least in part on a serial number associated with the gateway and site where the new gateway is to be operated.

18. An apparatus, comprising:
a geographically distributed virtual internet protocol router comprised of a plurality of gateways each comprising at least one data processor and at least one network interface unit, the geographically distributed virtual internet protocol router configured to provide at least one tunnel for each of the plurality of gateways to communicate with at least one peer gateway, wherein the geographically distributed virtual internet protocol router is configured to administrate as a single entity, and wherein a temporary tunnel is configured for each tunnel that was previously available to the geographically distributed virtual internet protocol router that is unavailable for communication, said automatic reconfiguration comprising reconfiguring the gateways which are part of a reconfiguration temporary tunnel route and without reconfiguring all of said plurality of gateways, where the geographically distributed virtual internet protocol router is further configured to enable partial provisioning of geographically distributed virtual internet protocol router information to a new gateway over an internal network, automatically provision remaining geographically distributed virtual internet protocol router information to the new gateway over an external network, and employ the provisioned geographically distributed virtual internet protocol router information to automatically join the new gateway to the geographically distributed virtual internet protocol router over the external network.

19. The apparatus of claim 18, further comprising:
an application proxy to provide an internet protocol (IP) address for an application in response to a request.

20. The apparatus of claim 18, further comprising:
a heart server configured to automatically reconfigure the temporary tunnel back to the tunnel if the tunnel becomes available for communication.

21. The apparatus of claim 18, further comprising:
a management console configured to enable automatic management of the operation of the geographically distributed virtual internet protocol (IP) router as a single entity.

22. The apparatus of claim 21, further comprising:
a dashboard configured to provide a visual representation of the geographically distributed virtual internet protocol (IP) router as a single entity.

23. The apparatus of claim 21, further comprising:
a dashboard that provides a display of information related to internally facing interfaces coupled to at least one gateway in the geographically distributed virtual internet protocol (IP) router.

24. The apparatus of claim 18, wherein internet protocol security (IPsec) is employed for a tunneled communication between gateways in the geographically distributed virtual internet protocol (IP) router.

25. The apparatus of claim 18, further comprising:
a virtual firewall that is configurable as a single entity in the geographically distributed virtual internet protocol (IP) router.

26. The apparatus of claim 25, wherein the virtual firewall further provides for a separate firewall at each gateway in the geographically distributed virtual internet protocol (IP) router.

* * * * *